(12) United States Patent
Penaloza et al.

(10) Patent No.: US 6,578,906 B2
(45) Date of Patent: Jun. 17, 2003

(54) PLATFORM AND PLATFORM SUPPORT SYSTEM

(75) Inventors: Joseph Thaddeus T. Penaloza, Fort Wayne, IN (US); Michael L. Noll, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/195,929

(22) Filed: Jul. 16, 2002

(65) Prior Publication Data

US 2002/0180230 A1 Dec. 5, 2002

Related U.S. Application Data

(62) Division of application No. 09/784,944, filed on Feb. 15, 2001.

(51) Int. Cl.$^7$ ................................................ B60N 3/00
(52) U.S. Cl. ...................... 296/190.02; 296/174; 5/118; 5/509.1
(58) Field of Search ................................ 296/174, 183, 296/190.02, 24.1, 190.01, 37.1, 37.6, 37.15, 65.05, 69, 37.16; 108/48, 49, 43, 44; 5/118, 119, 509.1, 11, 947, 136, 168; 248/371, 393, 352; 297/354.12, 354.13, 311, 313, 314, 337, 377

(56) References Cited

U.S. PATENT DOCUMENTS

| | | | | |
|---|---|---|---|---|
| 363,751 A | * | 5/1887 | Longfellow | 297/313 |
| 1,059,220 A | * | 4/1913 | Saxon | 297/313 |
| 1,984,602 A | * | 12/1934 | Snyder | 108/44 |
| 2,950,753 A | * | 8/1960 | Gleitsman et al. | 297/337 |
| 3,940,181 A | * | 2/1976 | Cheek, Jr. | 297/313 |
| 4,660,237 A | * | 4/1987 | Brodnax | 5/636 |
| 5,094,509 A | * | 3/1992 | Bolzacchini | 297/377 |
| 5,272,777 A | * | 12/1993 | Favagrossa | 297/377 |
| 5,597,201 A | * | 1/1997 | Hinze | 297/188.1 |
| 5,709,329 A | * | 1/1998 | Johnson | 108/44 |
| 6,000,751 A | * | 12/1999 | Kato et al. | 296/69 |

* cited by examiner

*Primary Examiner*—D. Glenn Dayoan
*Assistant Examiner*—Jason Morrow
(74) *Attorney, Agent, or Firm*—Jeffrey P. Calfa; Neil T. Powell; Dennis Kelly-Sullivan

(57) ABSTRACT

A platform and platform support system for an occupant cabin of a vehicle. The platform support system has a primary supporting structure and a prop, the combination of which provide full support for the platform. The prop of the platform support system can be engaged to one of a plurality of prop support points. The platform is supported in a different unique position by the platform support system when the prop is engaged to each different one of the plurality of prop support points. The platform includes accommodations for storing the prop in the platform when the prop is not in use as a support for the platform. The platform and platform support system can be included as part of a bed for the occupant cabin of a vehicle. Because the platform can be selectively supported in one of a plurality of unique positions, a user of the bed can configure the platform support system to provide a bed that is positioned to allow for a more comfortable sleeping environment for various circumstances.

16 Claims, 17 Drawing Sheets

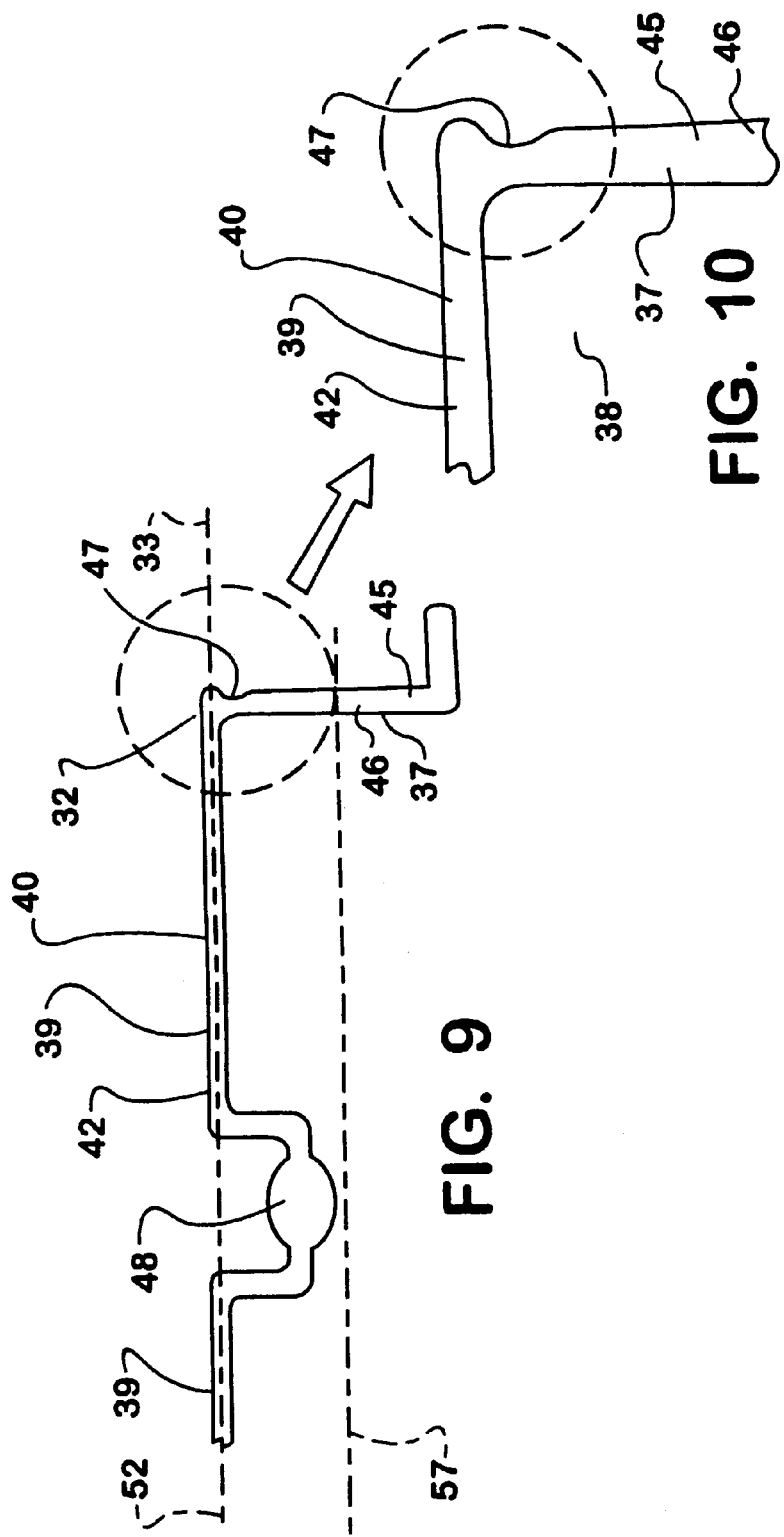

PLATFORM AND PLATFORM SUPPORT SYSTEM

This is a division of application Ser. No. 09/784,944, filed Feb. 15, 2001.

BACKGROUND OF THE INVENTION

The present invention is a platform and platform support system. More specifically the platform support system is for use in supporting a platform such as a storable bed in the interior of a vehicle. Many vehicles have platforms such as beds and tables that can be stored in one position and moved to another position for use. A platform support system that is capable of supporting a platform at only one height or angle is often less than optimal for some of the varying circumstances in which the platform may be used. Many support systems for beds in the interior of vehicles are capable of supporting the beds at only one angle relative to the vehicle. When a vehicle, which has such a bed and support system that can only be placed in one position for use, rests on a grade the bed is situated at an angle relative to horizontal and is often uncomfortable for the occupant. Similar problems are encountered in the use of other types of platforms such as tables that have platform support systems that provide for only one position of the platform. Platform support systems that have been designed to provide for more than one position of such platforms often involve complex mechanical devices which increase substantially the space occupied by the platform and may be costly to make and cumbersome to operate. In addition, users of platforms that have provisions for only one position of a platform often improvise methods of supporting the platform in positions other than those which the platform support system was designed to accommodate, some of which compromise the safety of the platform support system. For example, a spacer, such as a brick, is often added to a platform support system for a storable bed of the occupant cabin of a vehicle to alter the angle of the bed relative to the vehicle.

SUMMARY OF INVENTION

It is thus an object of the present invention to provide a platform support system for a platform that is capable of supporting the platform in multiple positions. It is a further object of the present invention to provide such a platform support system that is of a simple design, is easy to manipulate, and which minimally increases the space occupied by the platform and platform support system. The platform support system of the present-invention includes a platform, a first prop, and a first prop support structure. One or more prop support points are disposed on the platform and/or the first prop support structure. When the first prop is engaged to a prop engagement portion of the platform and the first prop support structure the prop engagement portion of the platform is supported vertically by the first prop, which is, in turn, supported by the first prop support structure. In the preferred embodiment, a first series of prop support points is disposed on either the platform or the first prop support structure. Each one of the prop support points of the first series of prop support points is spaced from the other prop support points of the first series of prop support points. A user of the platform support system may selectively engage the first prop to any one of the prop support points of the first series of prop support points. The prop engagement portion of the platform is supported in a unique combination of position and orientation when the first prop is engaged to each different one of the prop support points of the first series of prop support points. A user of the platform support system can thus selectively cause the platform to be supported in one of at least two unique positions by choosing which one of the prop support points of the first series of prop support points to engage the first prop to. The platform support system of the present invention may further be designed so that it minimally increases the space occupied by the platform. The first prop of the platform support system may be stored within a prop storage cavity defined within the platform structure. A handle that can be manipulated with one hand to move the prop from a stored position to an operational position may be engaged to the prop, making it easier to operate the platform support system. Thus, it can be seen that the above mentioned objects of the invention as well as others not mentioned have been met.

DRAWINGS

Other objects and advantages of the invention will become more apparent upon perusal of the detailed description thereof and upon inspection of the drawings in which:

FIG. 9 is a view of the first prop storage cavity, the first pivot shaft slot, and the handle storage cavity which are defined by the platform.

FIG. 10 is a close-up view of the prop retaining tab.

DETAILS OF INVENTION

Figure 1:
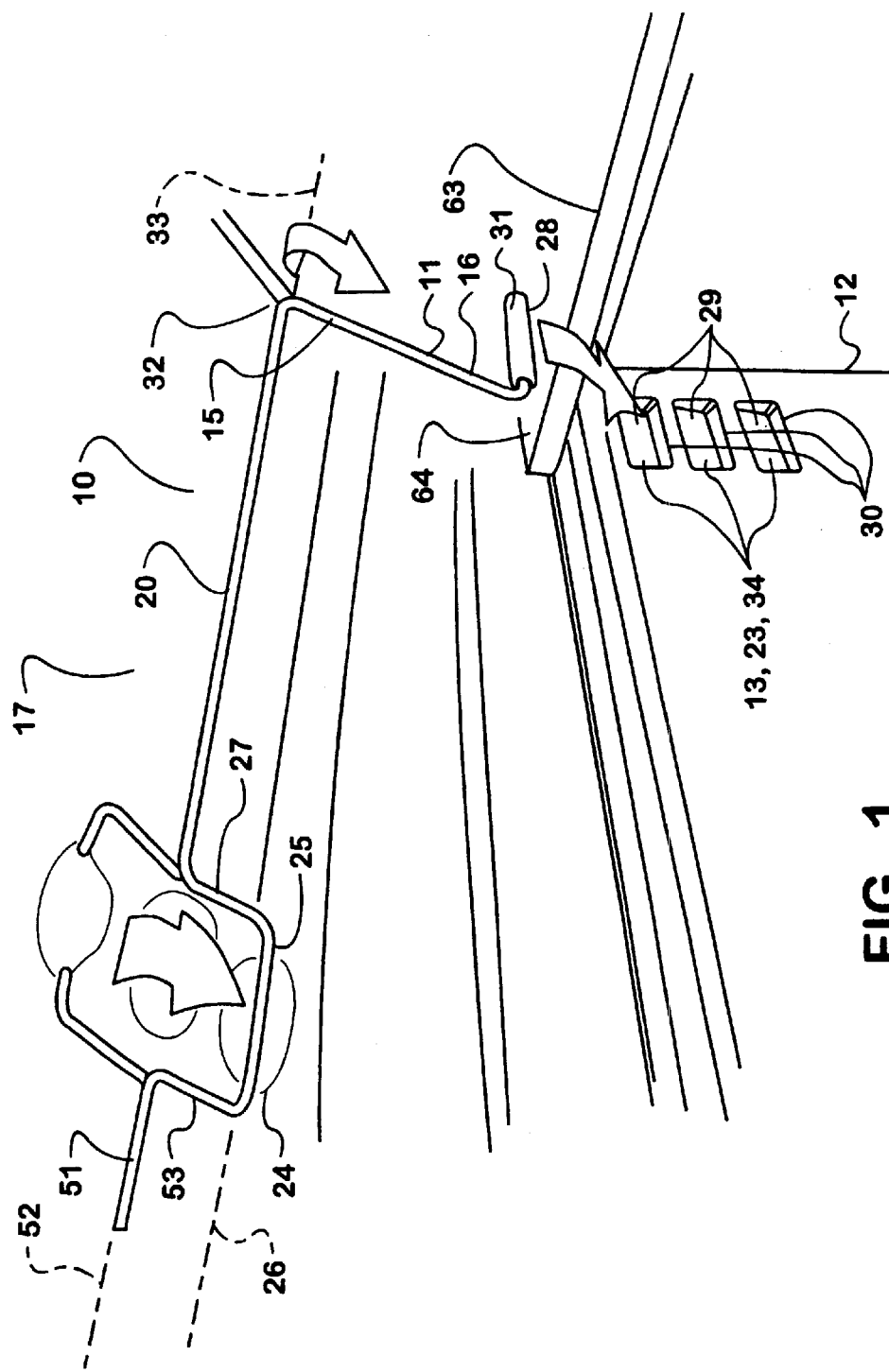
FIG. 1 is a perspective view of the first prop and the first prop support structure of the platform support system.
Figure 2:
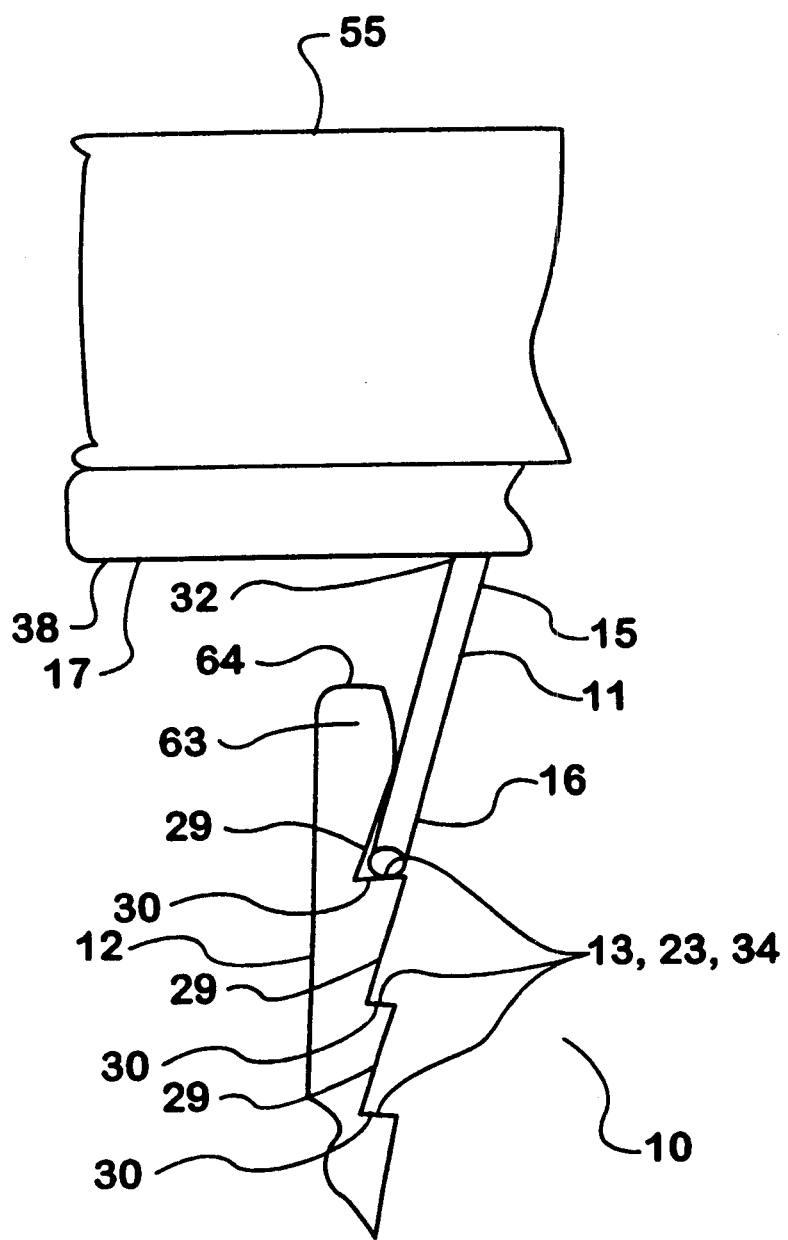
FIG. 2 is a side view of the platform being supported by the first prop which is engaged to a prop support point of the first prop support structure.
Figure 3:
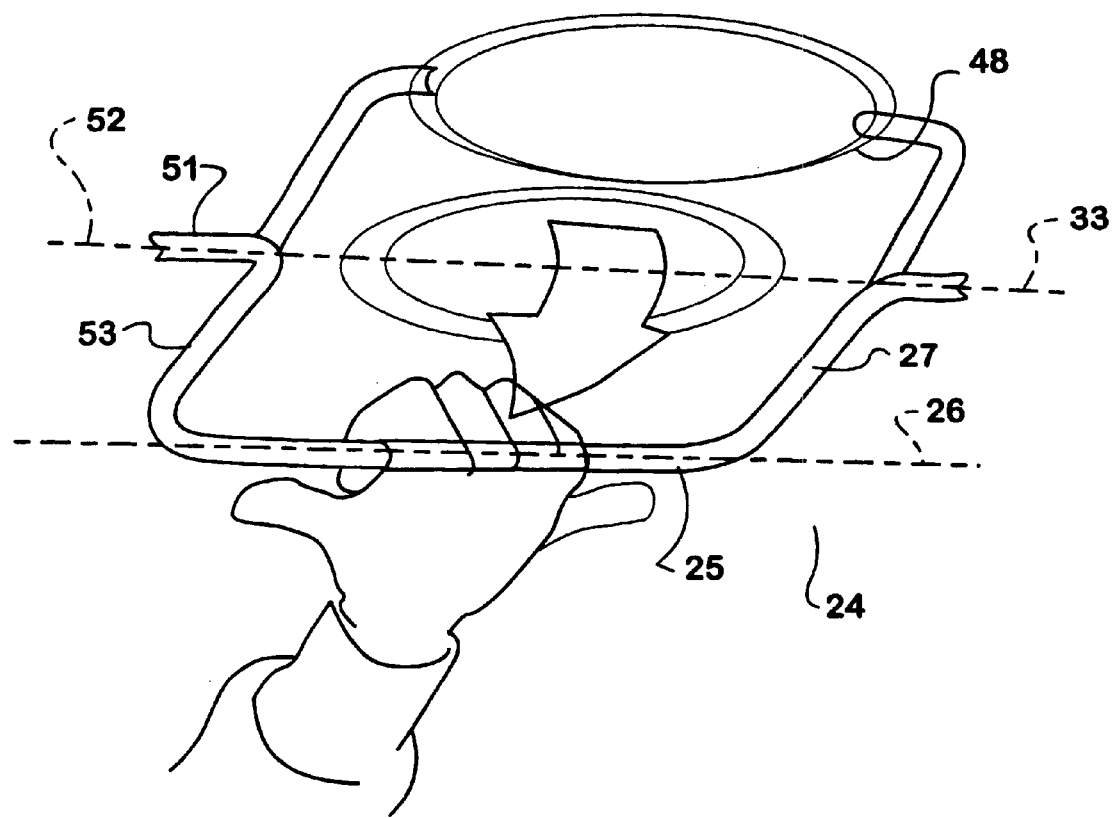
FIG. 3 is a perspective view of a user of the platform support system operating the prop handle of the platform support system.
Figure 4:
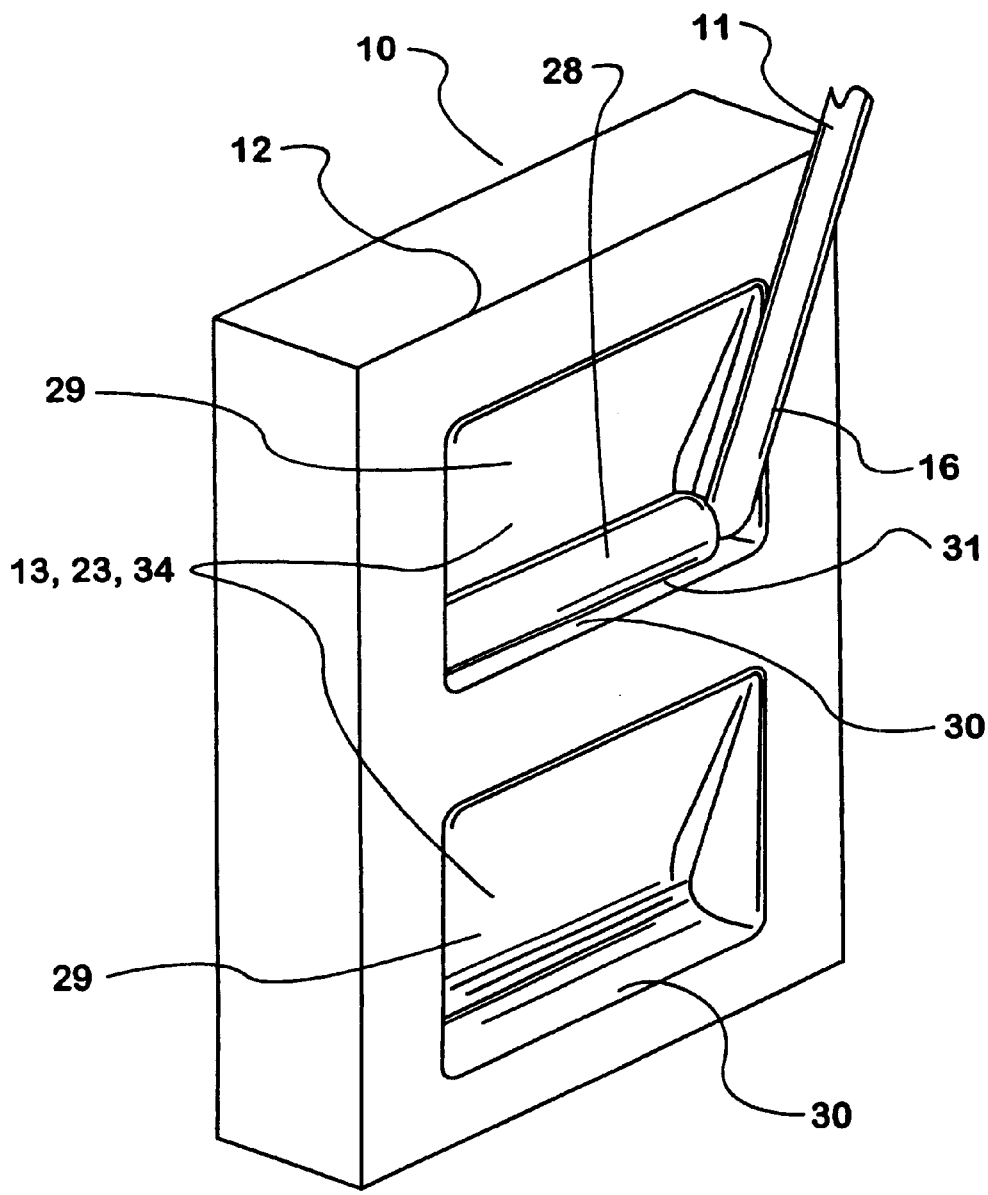
FIG. 4 is a perspective view showing the engagement of the first prop to a prop support point in one embodiment of the invention.
Figure 5:
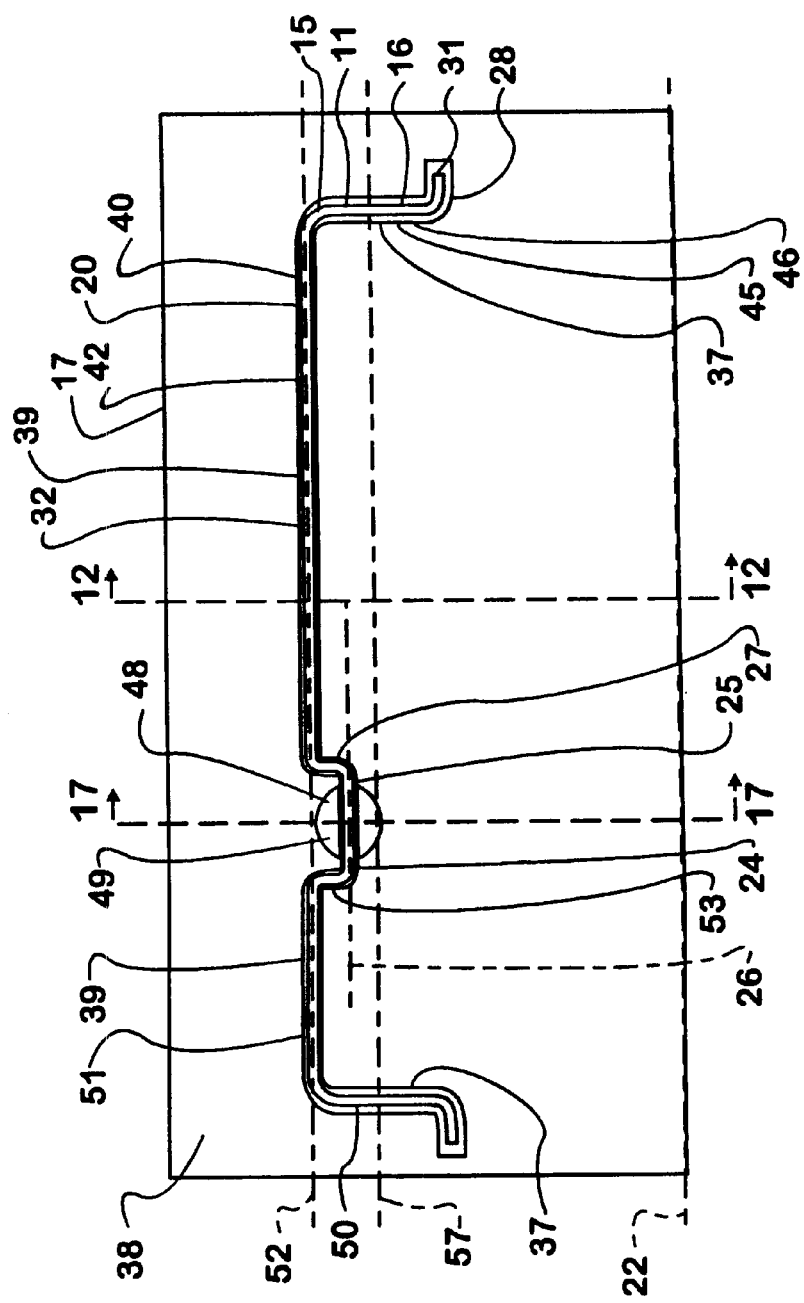
FIG. 5 is a view of the lower side of the platform with the first prop and the second prop assembled to the platform.
Figure 6:
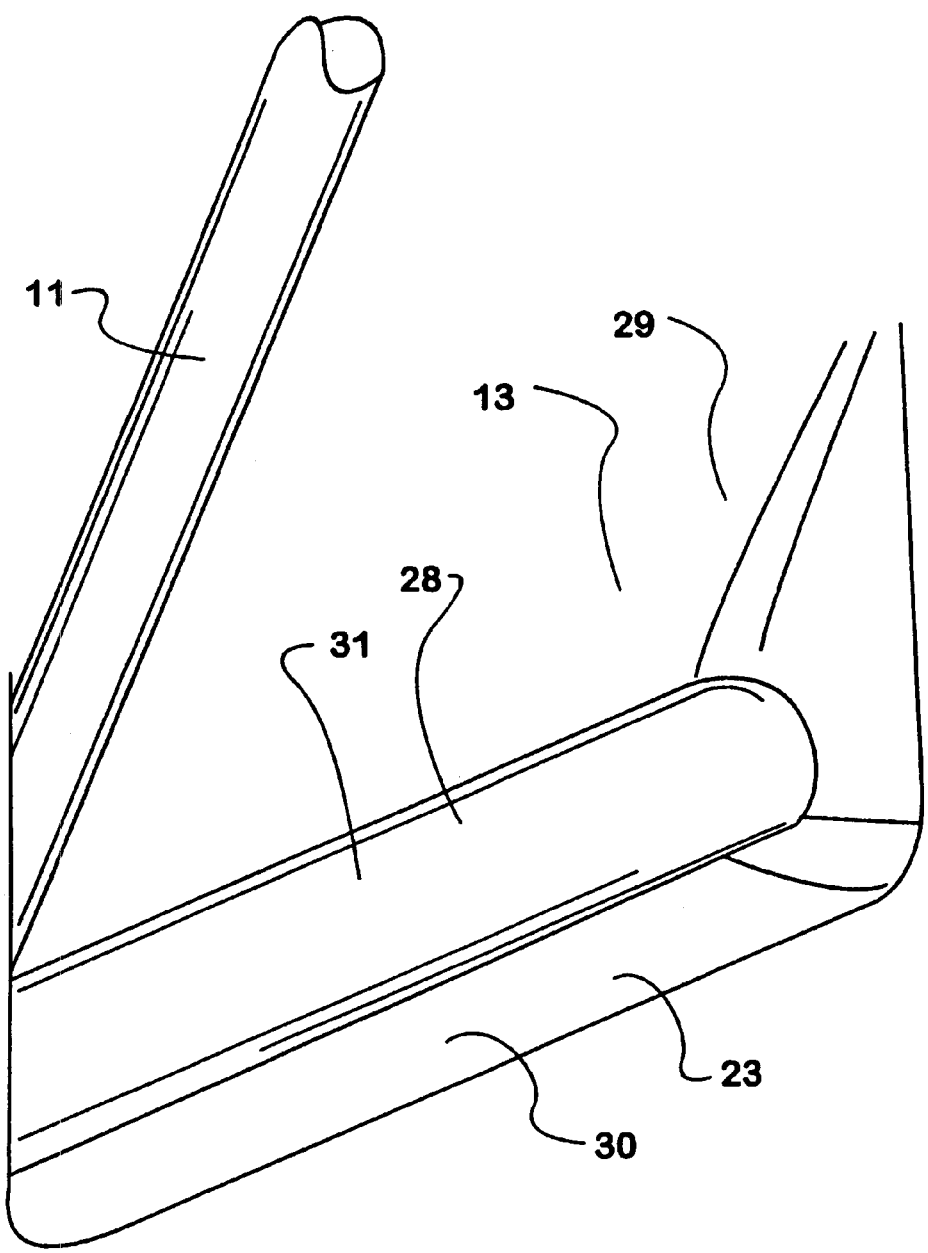
FIG. 6 is a perspective view of a potential embodiment of the abutment end of the first prop engaged to a prop support point.
Figure 7:
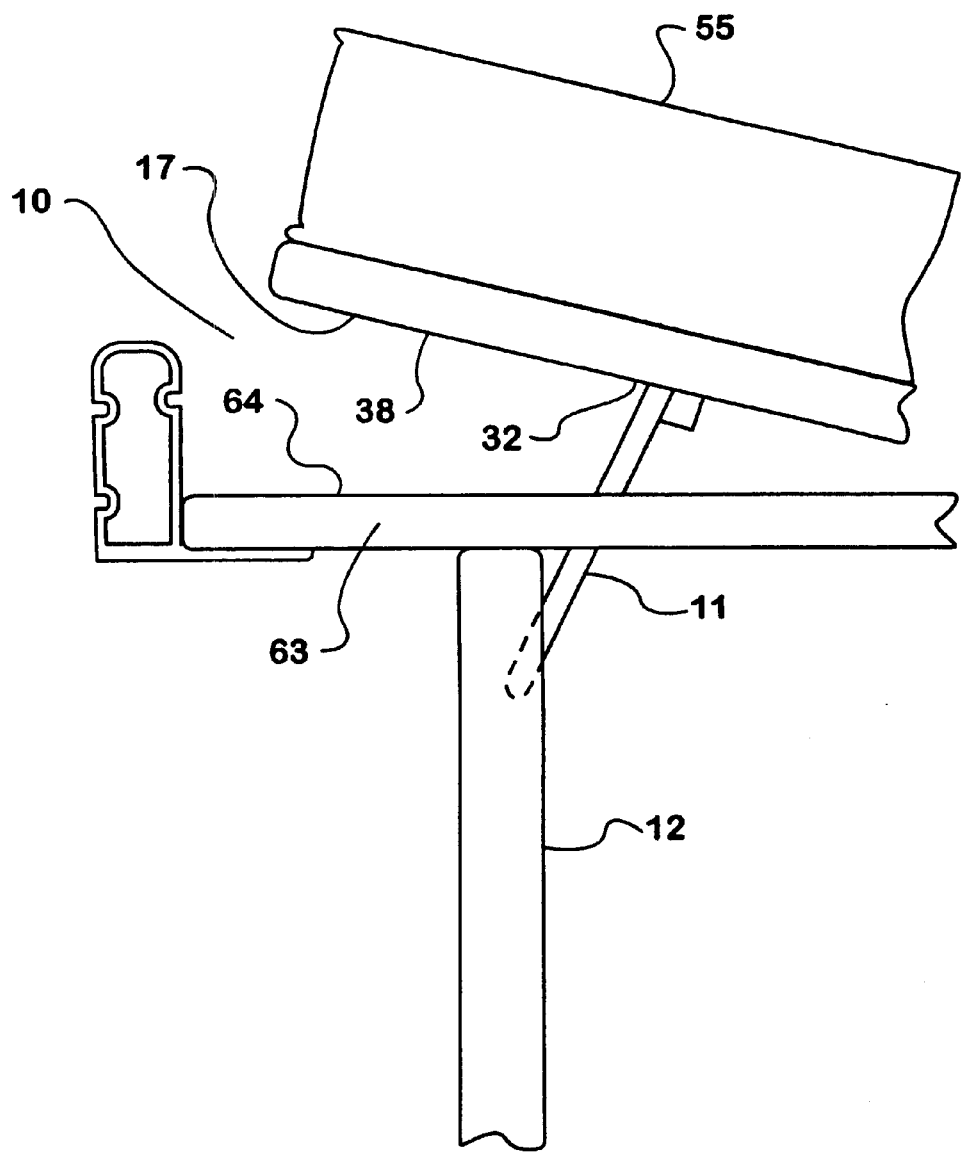
FIG. 7 is a side view of the platform and platform support structure showing the first prop engaged to a prop support point and supporting the platform in a position spaced above the default support structure.

The present invention is a platform 17 and a platform support system 10 for supporting the platform support system 10 of the present invention includes a platform 17, a first prop 11, and a first prop support structure 12. When the first prop 11 is engaged to a prop engagement portion 32 of the platform 17 and the first prop support structure 12, the prop engagement portion 32 of the platform 17 is supported vertically by the first prop 11, which is, in turn, supported by the first prop support structure 12. One or more prop support points 23 are disposed on the platform 17 and/or the first prop support structure 12. Each of these prop support points 23 is a structure to which an end of the first prop 11 can be temporarily but sturdily engaged. Preferably, at least one end of the first prop 11 is to be engaged to one of the prop support points 23 when the first prop 11 is engaged to the prop engagement portion 32 of the platform 17 and the first prop support structure 12. In the preferred embodiment, a first series of prop support points 34 is disposed on either the platform 17 or the first prop support structure 12. Each one of the prop support points 23 of the first series of prop support points 34 is spaced from the other prop support points 23 of the first series of prop support points 34. The platform 17 and the platform support system 10 are constructed such that a user of the platform support system 10 may selectively engage one end of the first prop 11 to any one of the prop support points 23 of the first series of prop support points 34. The prop engagement portion 32 of the platform 17 is supported in a unique combination of position and orientation when the first prop 11 is engaged to each different one of the prop support points 23 of the first series of prop support points 34. A user of the platform support system 10 can, thus, selectively cause the platform 17 to be supported in one of at least two unique positions by choosing which one of the prop support points 23 of the first series of prop support points 34 the first prop 11 is engaged to. The first prop 11 may be pivotally engaged only to whichever of the platform 17 and the first prop support structure 12 the first series of prop support points 34 is not disposed on. A first prop pivot shaft 20 may be engaged to the first prop 11 and whichever of the platform 17 and the first prop support structure 12 the first prop 11 is pivotally engaged to. An axis of the first prop pivot shaft 20 defines a first prop pivot axis 20. The first prop pivot shaft 33 is engaged to the first prop 11 and one of the platform 17 and the first prop support structure 12, in such a manner that rotation about the first prop pivot axis 33 is the only relative motion allowed between the engaged components. The structure which engages the first prop pivot shaft 20 to the platform 17 or the first prop support structure 12, in the above described manner, may be of many different forms which are well known. This structure for engaging the first prop pivot shaft to the platform 17 or the first prop support structure 12 may be comprised of various brackets, slots, bearings or other such components. In the preferred embodiment, the first series of prop support points 34 are spaced from each other in directions perpendicular to the first prop pivot axis 33. In the preferred embodiment, the first prop pivot shaft 20 is engaged to the first prop 11 and the platform 17. In this preferred embodiment the first series of prop support points 34 is disposed on the first prop support structure 12. In this embodiment a platform engagement end 15 of the first prop 11 is engaged to the first prop pivot shaft 20. An abutment end 16 of the first prop 11 is disposed opposite the platform engagement end 15 of the first prop 11. The abutment end 16 of the first prop 11 is designed to be engaged to one of the one or more prop support points 23.

The platform 17 derives only a portion of its support from the first prop 11, and must also be supported by a primary supporting structure 21. The primary supporting structure 21 is engaged to the platform 17 at portions of the platform 17 other than the prop engagement portion 32. The primary supporting structure 21 may be of many different forms that provide support to the platform 17 in complimentary fashion to the support that the first prop 11 provides to the platform 17. In other words the platform 17 must be fully supported vertically when the first prop 11 is supporting the prop engagement portion of the platform 17. The engagement of the primary supporting structure 21 to the platform 17 should allow the platform 17 freedom of movement in some degrees when the first prop 11 is not supporting the prop engagement portion 32 of the platform 17. It is necessary that the primary supporting structure 21 allow for movement of the platform 17 so that the platform 17 can be moved between stored and "in use positions" and also between the different positions in which the platform support system 10 can support the platform 17. In the preferred embodiment, the platform 17 is pivotally engaged to the primary supporting structure 21 at a side of the platform 17 opposite the prop engagement portion 32. In this embodiment, the engagement of the platform 17 to the primary supporting structure 21 fixes the platform 17 against horizontal translation and also against rotation about any axis other than a platform pivot axis 22. The platform pivot axis 22 would be disposed substantially parallel to horizontal. In the preferred embodiment, the primary supporting structure 21 also prevents a portion of the platform 17, which is near the platform pivot axis 22, from translating vertically. One possible embodiment of the primary supporting structure 21 which would provide support for the platform 17 as described above would include a hinge engaged at one side to the platform 17 and at the other side to a rigid structure. In this embodiment the pivot axis of the hinge is the platform pivot axis 22 of the platform support system 10. As mentioned above, when the first prop 11 is engaged to the platform 17 and the first prop support structure 12 the prop engagement portion 32 is supported vertically. Thus, when the first prop 11 is engaged to the platform 17 and the first prop support structure 12 the platform is completely supported vertically and is prevented from rotating about the platform pivot axis 22 in at least one direction. As mentioned above the prop engagement portion 32 of the platform 17 is supported in different unique positions when the first prop 11 is engaged to different ones of the one or more prop support points 23. Thus, with the platform 17 pivotally engaged to the primary supporting structure 21, a user of the platform support system 10 can cause the platform 17 to be supported at different angles relative to horizontal by engaging the first prop 11 to different ones of the one or more prop support points 23.

Other non-preferred arrangements for the engagement of the platform 17 to the primary supporting structure 21 are contemplated. The platform 17 may be engaged to the primary supporting structure 21 in a manner which prevents rotation of the platform 17 about any horizontal axis and which prevents translation of the platform 17 in horizontal directions but does not support the platform 17 vertically. In this instance, the platform 17 is fully vertically supported by the first prop 11, when the first prop 11 is engaged to the platform 17 and the first prop support structure 12.

The platform support system 10 may also include a default support structure 63 for supporting the platform 17 in combination with the primary supporting structure 21 when the first prop 11 is not supporting the platform 17. When the platform 17 is not supported by the first prop 11, the platform 17 rests against and is supported by the default support structure 63 in combination with the primary supporting structure 21. The platform 17 would engage the default support structure 63 at a point distant from the point of engagement between the platform 17 and the primary supporting structure 21. The design of the platform 17 and the default support structure 63 may be of many forms. The default support structure 63 may be comprised of any of a number of different types of structural elements which can provide rigid support for the platform 17. The platform 17 may also be comprised of any of a number of different types of structural elements, which engage the default support structure 63. In the preferred embodiment, an upper support surface 64 of the default support structure 63 engages the lower surface 38 of the platform 17 when the platform 17 is being supported by the default support structure 63. The platform support system 10 is preferably constructed such that, when the first prop 11 is engaged to the platform 17 and the first platform support structure 12, the platform 17 is supported in a position spaced above the default support structure 63.

Figure 12:
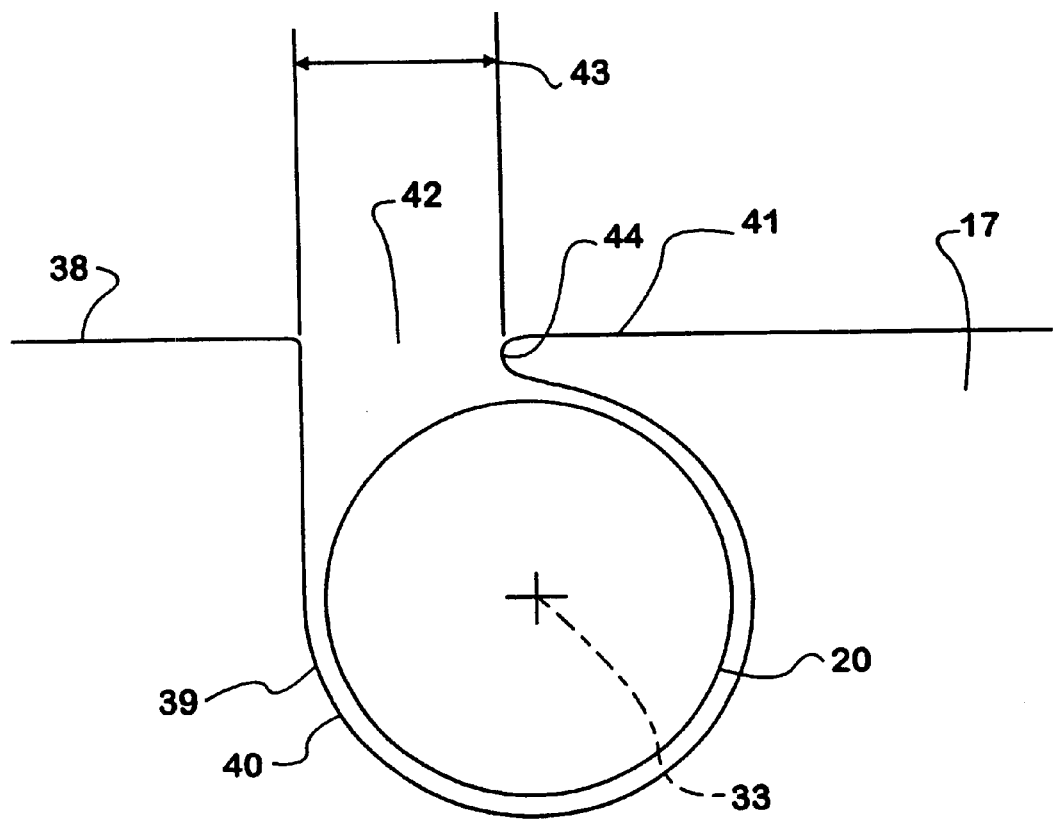
FIG. 12 is a sectional view through section line 12—12 of FIG. 5 of the platform with the first prop and the first prop pivot shaft assembled to the platform.
Figure 13:
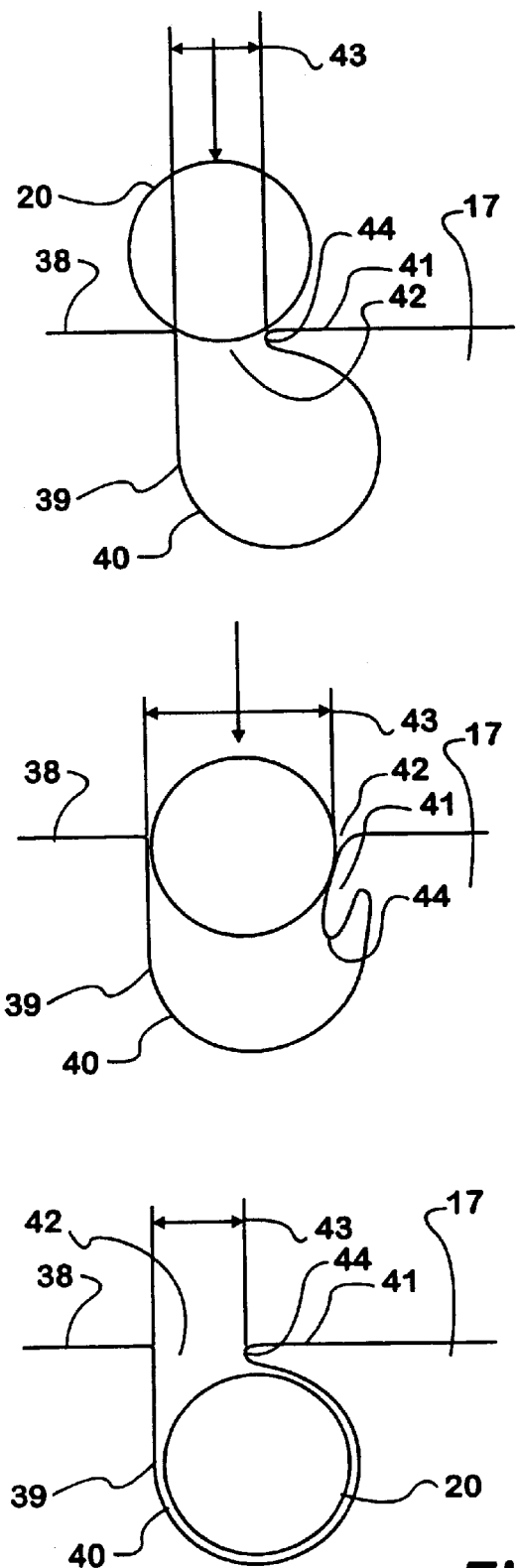
FIG. 13 is sectional view showing the first prop pivot shaft being inserted into the first pivot shaft slot.

In the preferred embodiment, the structure for engaging the first prop pivot shaft 20 to the prop engagement portion 32 of the platform 17 is integral to the platform 17. In this preferred embodiment one or more pivot shaft slots 39 are defined by the platform 17 inwardly of an outer surface of the platform 17 which outer surface is preferably the lower surface 38 of the platform 17. The first prop pivot shaft 20 is to be disposed within a first pivot shaft slot 40. A first pivot shaft insertion opening 42 is defined by the platform 17 at an outer surface of the platform 17, which is preferably the lower surface 38 of the platform 17. This first pivot shaft insertion opening 42 is adjacent to and in communication with the first pivot shaft slot 40. During assembly of the platform 17 and the platform support system 10 the first prop pivot shaft 20 can be inserted into the first pivot shaft slot 40 through the first pivot shaft insertion opening 42. As can be best seen in FIG. 12, cross-sections of portions of said first pivot shaft slot 40 are only slightly larger than corresponding cross-sections of the first prop pivot shaft 20. One or more pivot shaft locating tabs 41 protrude from one or more edges of the first pivot shaft insertion opening 42. A minimum width 43 of the first pivot shaft insertion opening 42 is a distance from a Up 44 of one of the pivot shaft locating tabs 41 to an opposing edge of the first pivot shaft insertion opening 42. This minimum width 43 of the first pivot shaft insertion opening 42 is less than a sectional width 45 of a portion of the first prop pivot shaft 20 which is located adjacent the respective one of the pivot shaft locating tabs 41. Thus, when the first prop pivot shaft 20 is disposed within the first pivot shaft slot 40 substantial movement of the first prop pivot shaft 20, other than rotation about and translation along the first prop pivot axis 33, is prevented. The platform 17 is constructed such that opposing edges and/or pivot shaft locating tabs 41 of the first pivot shaft slot 40 are substantially rigidly located but will deform elastically when pressed against with a great enough force. Thus, when the first prop pivot shaft 20 is pressed against the edges and pivot shaft locating tabs 41 of the first pivot shaft slot 40 with sufficient force during installation of the first prop pivot shaft 20, the edges and pivot shaft locating tabs 41 deform elastically. The minimum width 43 of the first pivot shaft insertion opening 42, thus, increases and the first prop pivot shaft 20 can be inserted into the first pivot shaft slot 40. Once the first prop pivot shaft 20 is properly installed within the first pivot shaft slot 40 the edges and pivot shaft locating tabs 41 return to their previous form and position so that the first prop pivot shaft 20 is retained within the first pivot shaft slot 40. The first prop pivot shaft 20 is thus snapped into place. This process of snapping the first prop pivot shaft 20 into place is illustrated in FIG. 13.

The structure of any ends of the first prop 11 that are designed to be engaged to the one or more prop supports points 23 and the structure of each of the one or more prop support points 23 may be of many forms. It is only necessary that these components be constructed such that the first prop 11 can be temporarily but sturdily engaged to the one or more prop support points 23. An end of the first prop 11, which is engaged to a prop support point, must be prevented from translating relative to the prop support point 23 to which the end is engaged. Each of the one or more prop support points 23 may be comprised of brackets. The brackets and an end of the first prop 11 may be of many different forms as long as they meet the functional requirements of engagement described above. In the preferred embodiment each of the one or more prop support points 23 is comprised of a support cavity 13, the surfaces of which an end of the first prop can be place in abutment with such that the end derives support from the support cavity. Each of the support cavities 13 is at least partially defined by a substantially vertical abutment surface 29 and a substantially horizontal abutment surface 30. Preferably, both the substantially vertical abutment surface 29 and the substantially horizontal abutment surface 30 are designed to be parallel to the first prop pivot axis 33 when the platform support system 10 and the platform 17 are properly assembled. In the preferred embodiment, a first abutment member 28 is engaged to an end of the first prop 11 which is designed to be engaged to a support cavity 13. The first abutment member 28 is disposed substantially parallel to and at a distance from the first prop pivot axis 33. When engaged to a support cavity 13, the first abutment member 28 abuts the substantially vertical surface 29 and the substantially horizontal surface 30 of the respective support cavity 13 to which the end of the first prop 11 is engaged.

The platform support system 10 may further include structure to make it easier to manipulate the position of the first prop 11. A prop handle 24 may be engaged directly or indirectly to the first prop 11. The prop handle 24 would have a handle grip member 25 around which one would rap their fingers. A grip axis 26 of the handle grip member 25 would preferably be disposed parallel to, and at a distance from the first prop pivot axis 33. The handle grip member 25 would be engaged to a first handle moment arm 27 fixedly, or alternatively, in a manner preventing any movement of the handle grip member 25 relative to the first handle moment arm 27 other than rotation about the grip axis 26. The first handle moment arm 27 would in turn be fixedly engaged directly or indirectly to the first prop 11. In the preferred embodiment, the fist handle moment arm 27 is fixedly engaged to the first prop pivot shaft 20 which is in turn fixedly engaged to the first prop 11. A user of the platform support system 10 could thus manipulate the handle grip member 25 and rotate the first prop pivot shaft 20 which would in turn rotate the first prop 11. In this embodiment, the first handle moment arm 27 is disposed substantially parallel to a portion of the first prop 11 adjacent the intersection of the first prop 11 and the first prop pivot shaft 20.

A handle storage cavity 48 may also be defined by the platform 17. The handle storage cavity 48 would extend inwardly from an outer surface of the platform 17, which outer surface would preferably be the lower surface 38 of the platform 17. The handle storage cavity 48 would be positioned on the platform 17 such that the prop handle 24 would be disposed within the handle storage cavity 48 when the prop 11 is disposed within the first prop storage cavity 45. It is preferred that the handle storage cavity 48 be of a shape and of sufficient size that a hand clearance void 49 is defined adjacent the handle grip member 25 when the prop handle 24 is disposed within the handle storage cavity 48. The presence of the hand clearance void 49 allows a user of the platform support system 10 to grasp the handle grip member 25 when the prop handle 24 is disposed within the handle storage cavity 48.

The platform 17 of the present invention may have means for storing the first prop 11 and a second prop 50 (where applicable) when they are not in use as a support for the platform 17. The platform 17 may define one or more prop storage cavities 37 inwardly of an outer surface of the platform, which outer surface would preferably be the lower surface 38 of the platform 17. The one or more prop storage cavities 37 would be of sufficient size and depth that the first prop 11 and the second prop 50 (where applicable) may be contained within the one or more prop storage cavities 37 substantially inwardly of the outer surface of the platform 17. The first prop 11 would ideally be stored within a first prop storage cavity 45 when the first prop 11 is not in use as a support for the platform 17. In the preferred embodiment, the first prop storage cavity 45 is open to an outer surface of the platform 17 which is preferably the lower surface 38 of the platform 17. In this preferred embodiment, the platform 17 defines a first prop opening 46 at an outer surface of the platform 17 which is preferably the lower surface 38 of the platform 17. The first prop opening 46 is adjacent to and in communication with the first prop storage cavity 45. The first prop opening 46 is of a shape such that the first prop 11 may be moved into or out of the first prop storage cavity 45 through this first prop opening 46. The first prop storage cavity 45 and the first prop opening 46 are preferably shaped and positioned such that they intersect the first pivot shaft slot 40 and the first pivot shaft insertion opening 42 where the first prop pivot shaft 20 and the first prop 11 intersect.

A handle storage cavity 48 may also be defined by the platform 17. The handle storage cavity 48 would extend inwardly from an outer surface of the platform 17, which outer surface would preferably be the lower surface 38 of the platform 17. The handle storage cavity 48 would be positioned on the platform 17 such that the prop handle 24 would be disposed within the handle storage cavity 48 when the prop 11 is disposed within the first prop storage cavity 45. It is preferred that the handle storage cavity 48 be of a shape and of sufficient size that a hand clearance void 49 is defined adjacent the handle grip member 25 when the prop handle 24 is disposed within the handle storage cavity 48. The presence of the hand clearance void 49 allows a user of the platform support system 10 to grasp the handle grip member 25 when the prop handle 24 is disposed within the handle storage cavity 48.

Figure 8:
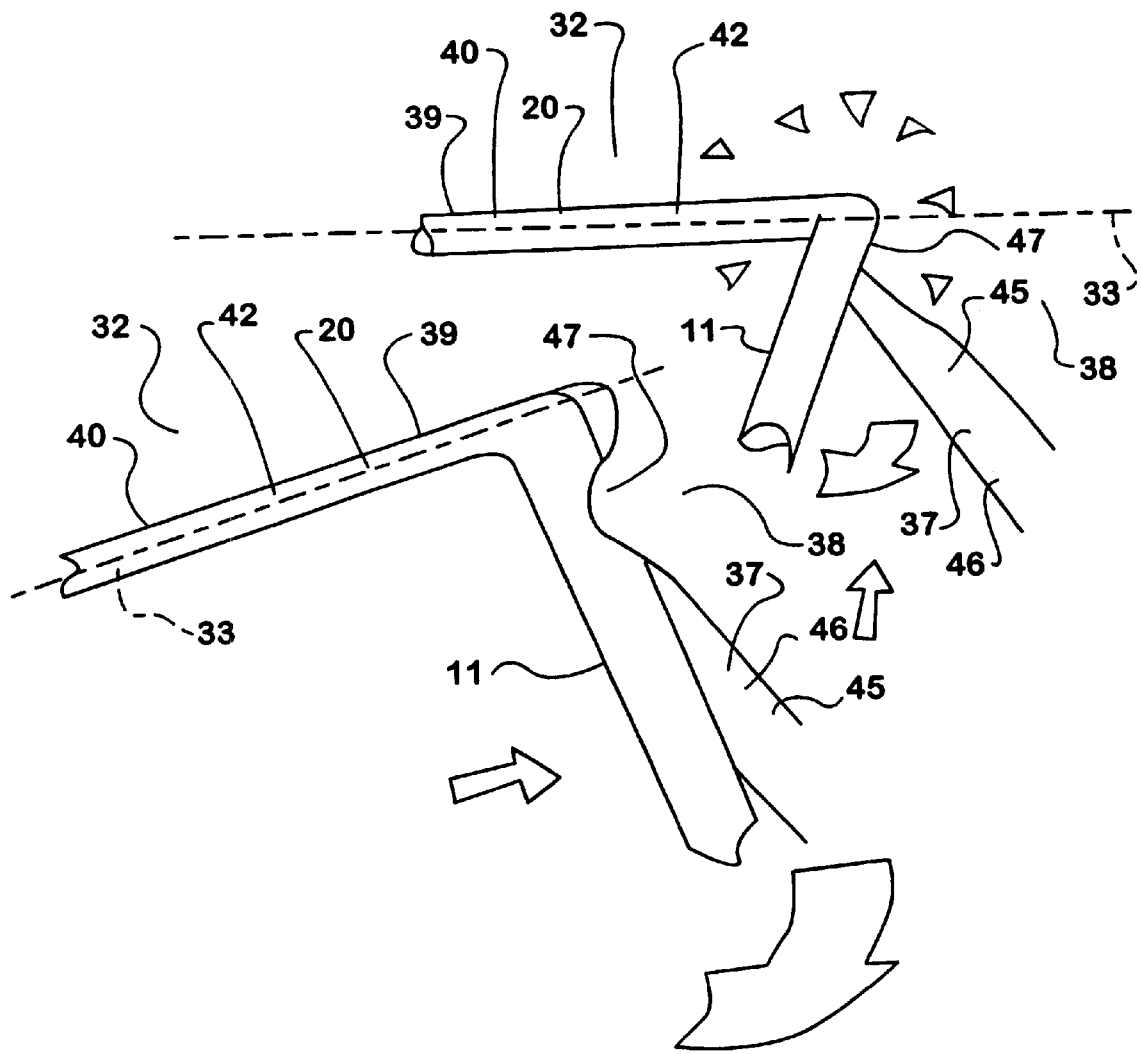
FIG. 8 is a perspective view of the first prop being moved past the prop retaining tab and then being maintained perpendicular to the lower surface of the platform by the prop retaining tab.
Figure 11:
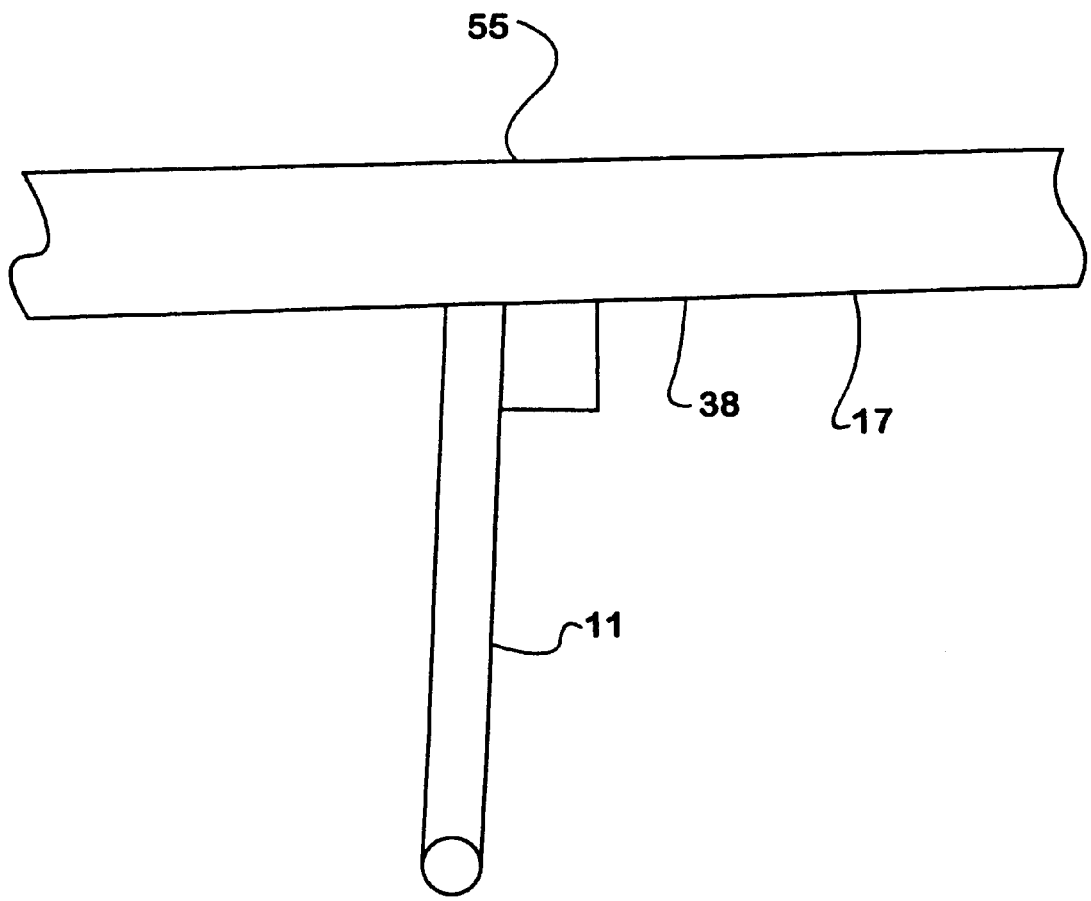
FIG. 11 is a side view of the platform and the first prop, which illustrates the perpendicular relationship between the lower surface of the platform and the first prop which is maintained by the prop retaining tab.

Structure may be present to retain the first prop 11 in either a "stored" or "operative" position. A prop retaining tab 47 may be engaged to the platform 17. The preferred embodiment of the prop retaining tab 47 is best shown in FIGS. 8, 9, and 10. The prop retaining tab 47 would protrude into a path through which the first prop 11 would travel as the first prop 11 rotates about the first prop pivot axis 33. The first prop 11 would, thus, eventually contact the prop retaining tab 47 as it travels toward the prop retaining tab 47. Thus the first prop 11 would be retained on a side of the prop retaining tab 47 on which it is disposed. The prop retaining tab 47 and/or the first prop 11 are of a construction such that one or both will flex if subjected to forces of sufficient magnitude. Thus, when the first prop 11 is forcefully urged against the prop retaining tab 47, one or both of the components deform elastically and allow the first prop 11 to pass the prop retaining tab 47. This allows a user of the platform support system 10 to move the first prop 11 to either side of the prop retaining tab 47, after which the first prop 11 is retained on that side of the prop retaining tab 47. Preferably the prop retaining tab 47 is disposed near the outer surface of the platform 17 which defines the first prop opening 46 and also near the intersection of the first prop 11 and the first prop pivot shaft 20. Thus, the first prop 11 can be retained within the first prop storage cavity 45 on one side of the prop retaining tab 47. The first prop 11 can alternatively be retained substantially perpendicular to the outer surface of the platform 17 which defines the first prop opening 46, on the other side of the prop retaining tab 47.

The second prop 50 is included in the preferred embodiment of the platform support system 10. The second prop 50 would be fixedly engaged to a second prop pivot shaft 51. An axis of the second prop pivot shaft 51 would define a second prop pivot axis 52. The second prop pivot shaft 51 would be engaged to the prop engagement portion 32 of the platform 17 in a manner preventing relative motion, other than rotation about the second prop pivot axis 52, between the second prop 50 and the platform 17. The second prop pivot shaft 51 is preferably disposed such that the second prop pivot axis 52 is coincident with the first prop pivot axis 33. A second handle moment arm 53 would be fixedly engaged to the second prop pivot shaft 51. The second handle moment arm 53 would also be engaged to the handle grip member 25 fixedly or, alternatively, in a manner preventing any movement of the handle grip member 25, relative to the second handle moment arm 53, other than rotation about the grip axis 26. The second handle moment arm 53 would be disposed substantially parallel to the first handle moment arm 27. A second series of prop support points 54 would be disposed either on the first prop support structure 12 or a second prop support structure.

The platform support system 10 may have structure present to aid in maintaining engagement between the first prop 11 and the support cavities 13 which the one or more prop support points 23 are preferably comprised of. A first friction element 31 may be engaged to an end of the first prop 11 that is to be engaged to a support cavity 13. The first friction element 31 would be disposed on the first prop 11 in such a position that it is disposed between an end of the first prop 11 and the support cavity 13 when the first prop 11 is engaged to the support cavity 13. The inclusion of the first friction element 31 in the platform support system 10 would result in a relatively high coefficient of friction between the end of the first prop 11 and the support cavity 13. Thus, it would take a greater force to slide the end of the first prop 11 relative to the support cavity 13 and the engagement between the end of the first prop 11 and the support cavity 13 is more likely to be maintained. The first friction element 31 may be composed of rubber or any other material that would cause there to be a higher coefficient of friction between the end of the first prop 11 and the support cavity 13. In the preferred embodiment the first friction element 31 is disposed substantially surrounding the first abutment member 28 of the abutment end 16 of the first prop 11.

Figure 14:
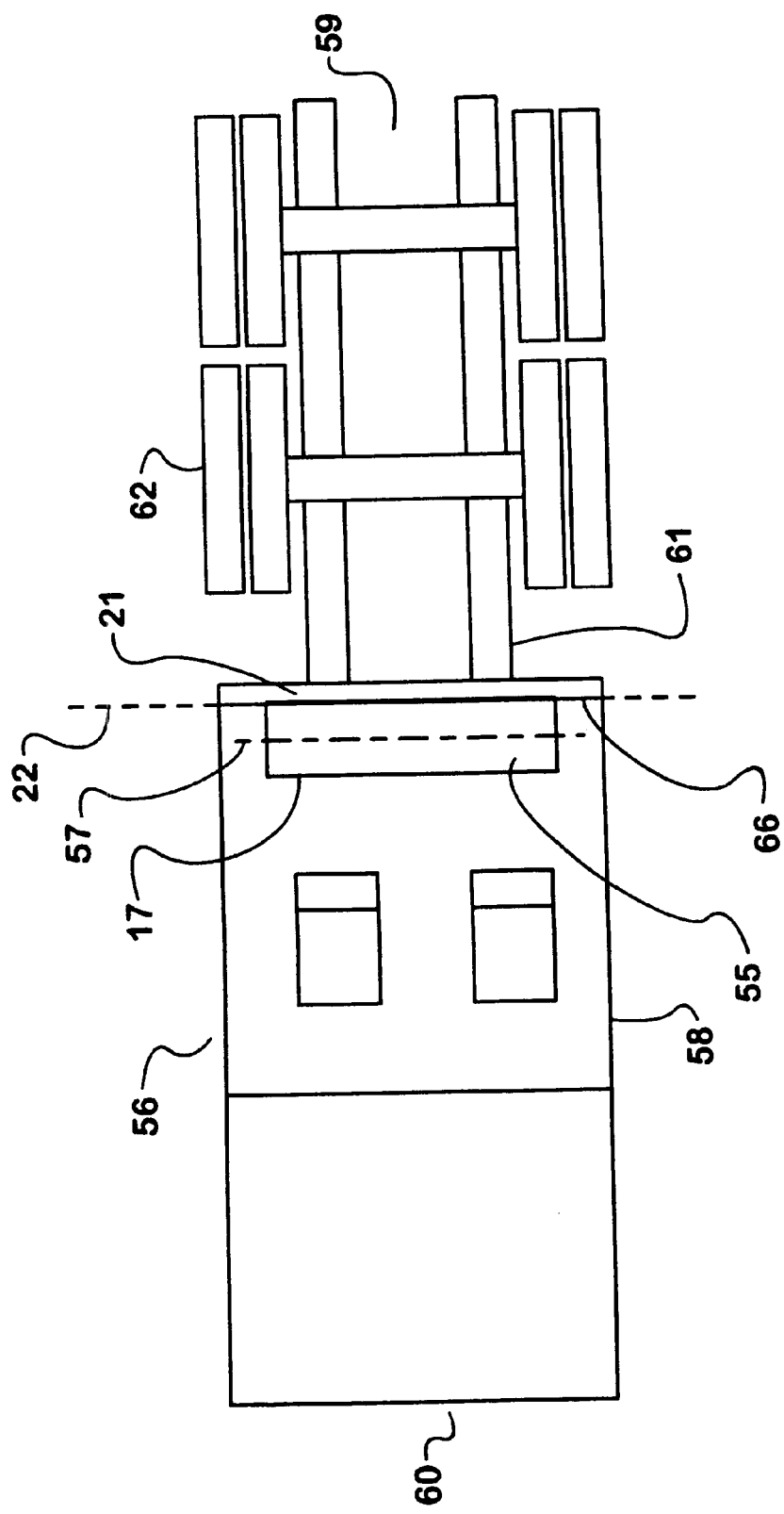
FIG. 14 is a top view of a vehicle with the platform and platform support system installed in the vehicle.
Figure 15:
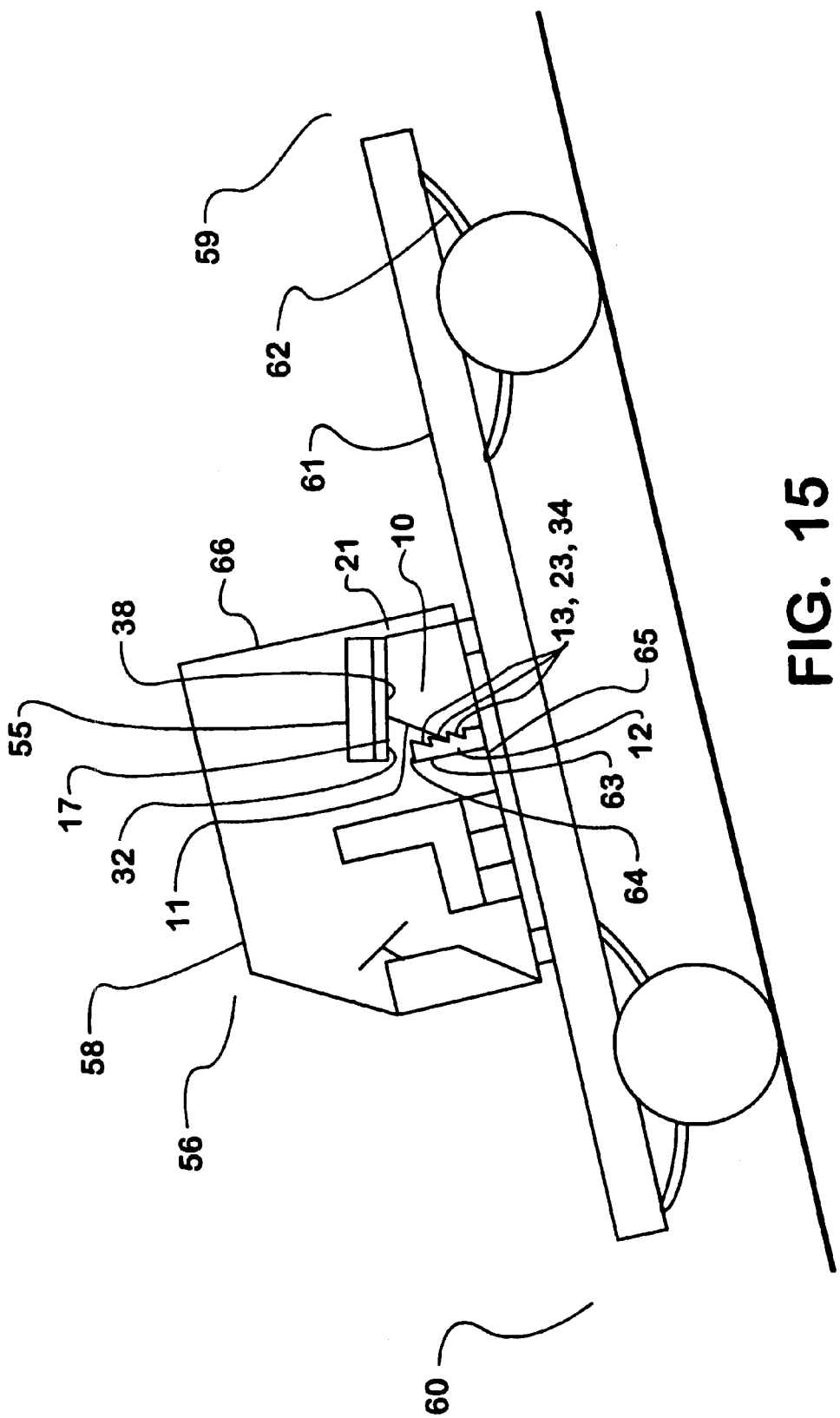
FIG. 15 is a side view of a vehicle with the platform and platform support system installed in the vehicle.
Figure 16:
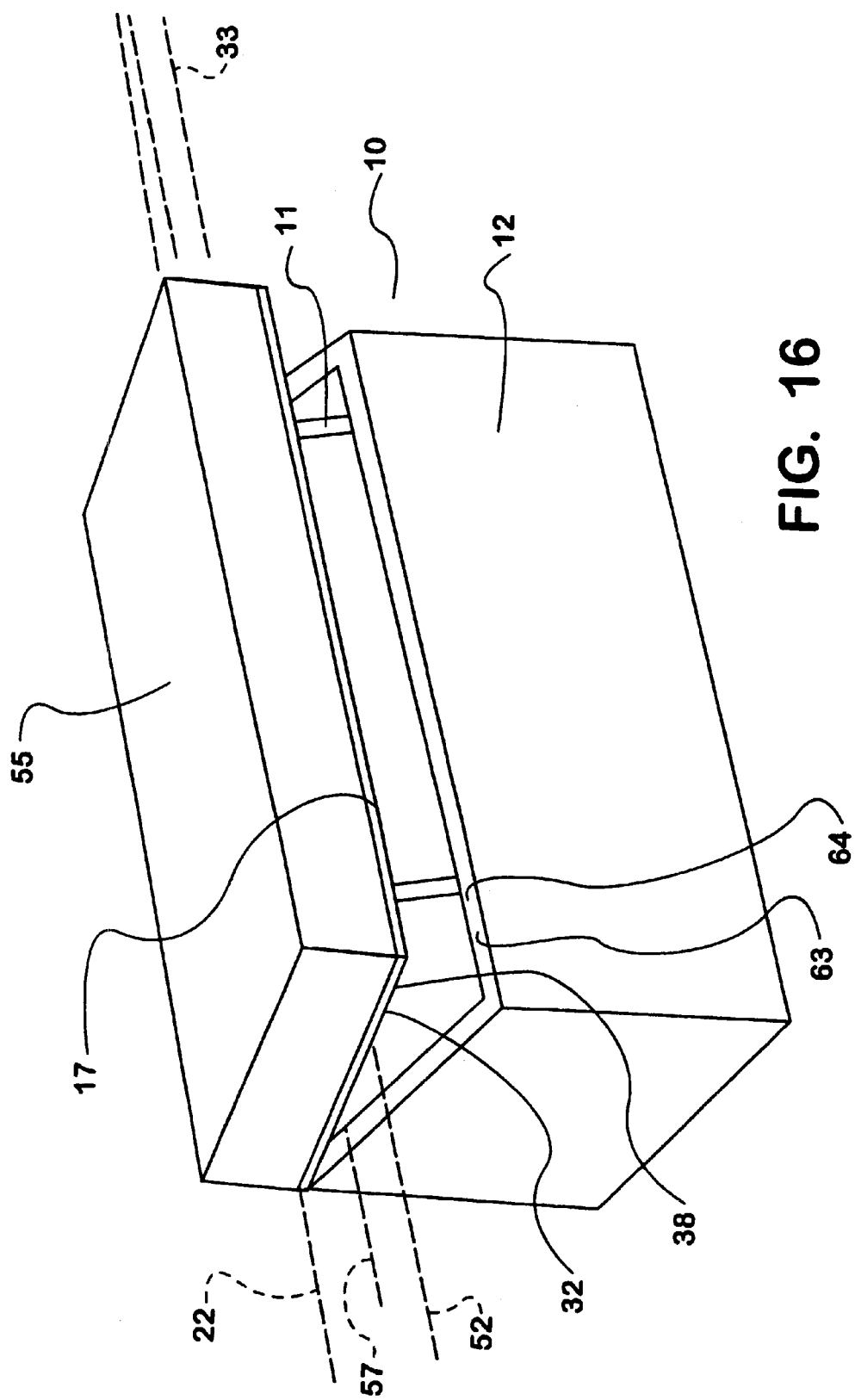
FIG. 16 is a perspective view of the platform and platform support system, which shows the primary supporting structure and the default support structure.
Figure 17:
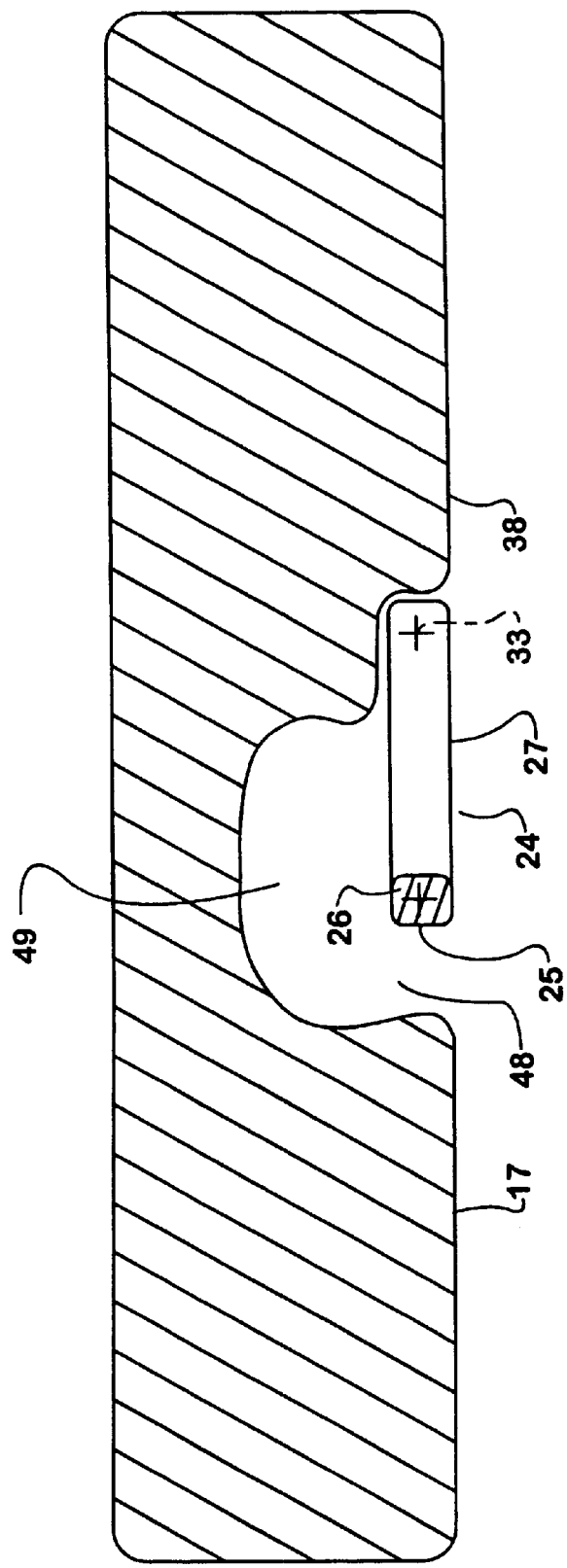
FIG. 17 is a sectional view through section line 17—17 of FIG. 5, of the platform, prop handle, and prop handle storage cavity.
Figure 18:
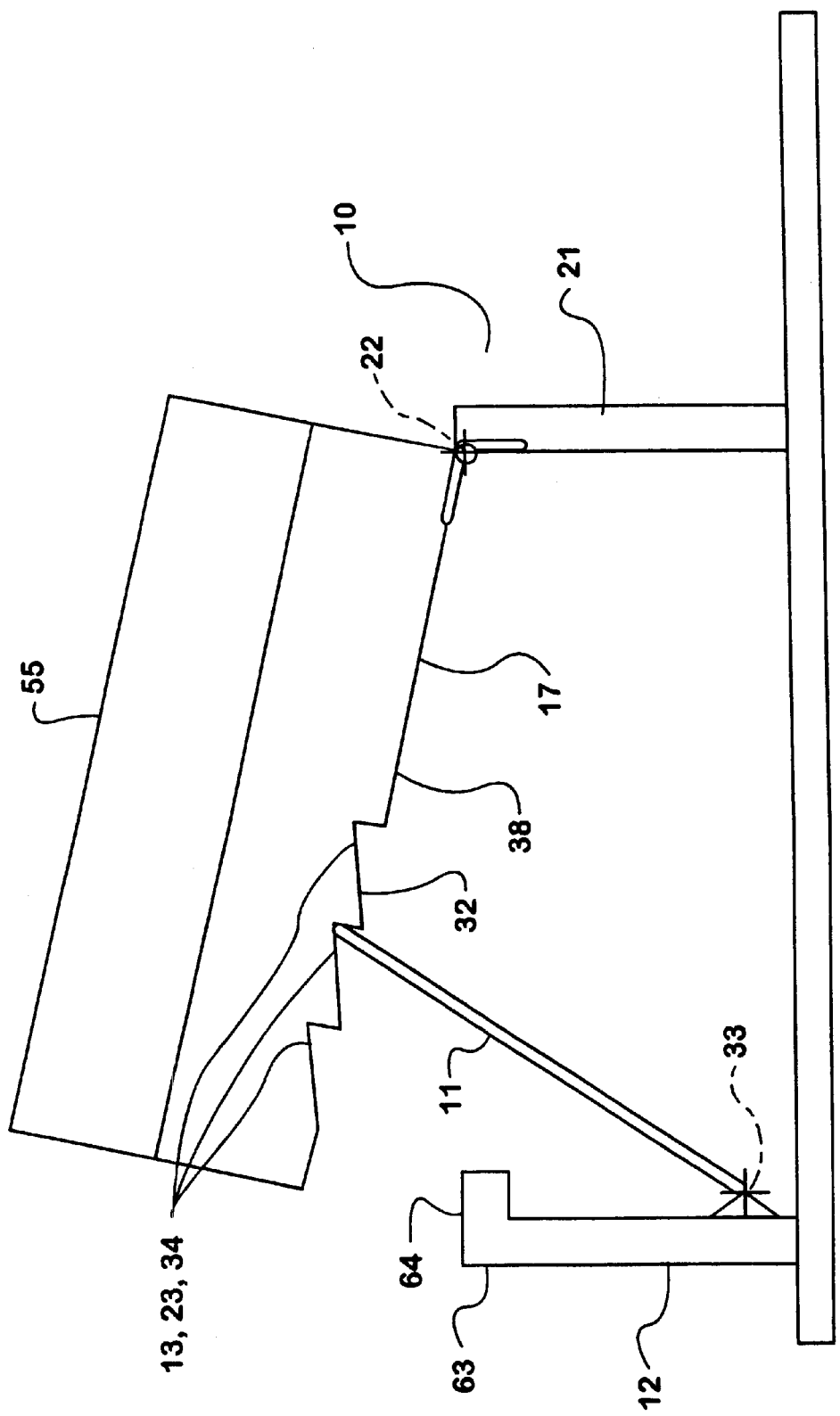
FIG. 18 is a side view of a platform and platform support system where the first series of prop support points is disposed on the platform.

In the preferred embodiment, the platform support system 10 of the present invention comprises a portion of a bed for the interior of a vehicle 56. Bedding components 55, such as a mattress, sheets and or other such devices may be engaged to the platform 17 so that a person may sleep upon the platform 17. The platform 17 would be engaged through the platform support system 10 to an occupant cabin 58 of a vehicle 56. Such a platform for use in supporting a bed in the interior of a vehicle 56 is generally disposed within the vehicle 56 with a longitudinal axis 57 of the platform 17 oriented laterally across the vehicle 56 as is shown in FIG. 14. The platform 17 would preferably be pivotally engaged to the primary supporting structure 21 on a side of the platform 17 toward the rear 59 of the vehicle 56. The primary supporting structure 21 would in turn be engaged to the occupant cabin 58 of the vehicle 56. The engagement of the platform 17 to the primary supporting structure 21 would be such that the platform pivot axis 22 would also be disposed laterally across the vehicle 56. The first prop 11 and the second prop 50 (where applicable) are preferably engaged to a side of the platform 17 opposite the point of engagement between the platform 17 and the primary supporting structure 21. The first prop pivot axis 33 and the second prop pivot axis 52 (where applicable) are also preferably disposed laterally in relation to the vehicle 56. The first prop support structure 12 and the second prop support structure (where applicable) would be engaged to the occupant cabin 58 near a side of the platform 17 which is nearest a front 60 of the vehicle 56. By engaging the one or more props of the platform support system 10 to different ones of the prop support points 23 a user of the platform support system 10 could cause the platform 17 to be supported at different angles with respect to the vehicle 56. The user could thus ensure that the platform 17, and thus their bed, is substantially parallel to horizontal regardless of the magnitude of a slope that the vehicle 56 might be resting on. The platform support system 10 may further include the default support structure 63 described above. A default support structure 63 for use with a platform support system 10 of a bed disposed within a vehicle 56 would preferably support the platform 17 such that it is parallel with respect to a floor 65 of the occupant cabin 58. In this embodiment, the portion of the platform 17 which is pivotally engaged to the primary supporting structure 21 is preferably disposed adjacent an interior vertical wall 66 of the occupant cabin 58. Thus, the platform 17 can be supported, either by the default support structure 63 or the first prop 11, such that it has no slope or a downward slope with respect to horizontal in a direction toward the interior vertical wall 66. An occupant of the bed is thus prevented from sliding off because the platform 17 is level or slopes toward the interior vertical wall 66 of the occupant cabin 58 which would maintain the occupant in the bed.

The vehicle 56 to which the platform support system 10 is engaged is comprised of a number of other components. The occupant cabin 58 of the vehicle 56 is engaged to and derives support from a frame 61. A suspension system 62 is engaged to and would support the frame 61.

Those skilled in the art will appreciate that modifications could be made to the invention as described without departing from the spirit and scope of the invention and thus the scope of the invention is limited only by the following claims.

We claim:

1. A platform and platform support system, comprising:
   (a) a platform;
   (b) a primary supporting structure engaged to said platform,
   (c) wherein said primary supporting structure is arranged and engaged to said platform such that said primary supporting structure constrains said platform against movement in some degrees and allows freedom of movement of said platform in other degrees;
   (d) a first prop;
   (e) a first prop support structure;
   (f) a first series of prop support points, which are spaced relative to each other and are disposed on either said platform or said first prop support structure;
   (g) wherein when said first prop is engaged to a prop support point of said first series of prop support points and to whichever of said platform and said first prop support structure said first series of prop support points is not disposed on, a prop engagement portion of said platform is supported vertically by said first prop, which is, in turn, supported by said first prop support structure;
   (h) wherein said prop engagement portion of said platform would be supported in a different unique position when said first prop is engaged to each different one of said first series of prop support points and, thus, for a platform with a given arrangement of said primary supporting structure said platform is supported in a unique combination of position and orientation when said first prop is engaged to each different one of said first series of prop support points.
   (i) wherein said platform is pivotally engaged to said primary supporting structure at a point distant from said prop engagement portion of said platform such that said platform is supported vertically by said primary supporting structure at a point of engagement between said primary supporting structure and said platform;
   (j) wherein rotation of said platform about a platform pivot axis, which is disposed substantially parallel to horizontal, is the only movement of said platform relative to said primary supporting structure allowed by said engagement of said primary supporting structure to said platform;
   (k) wherein when said first prop is engaged to said prop engagement portion of said platform and said prop support structure and said prop engagement portion of said platform is thus vertically supported, said platform is fully supported vertically and prevented from rotating about said platform pivot axis in at least one direction, and
   (l) wherein said platform is supported at a unique angle relative to horizontal when said first prop is engaged to each different one of said first series of prop support points.
   (m) a default support structure;
   (n) wherein said default support structure is disposed such that said platform may alternatively be supported by said primary supporting structure and said default support structure, or by said primary supporting structure and said first prop;
   (o) wherein, when said first prop is disposed in a position other than ones in which said first prop is engaged to said prop engagement portion of said platform and said first prop support structure, said platform engages and is vertically supported by said default support structure in addition to said primary supporting structure; and (p) wherein said first prop support structure, said platform, said first prop, and said primary supporting structure are constructed and arranged such that, when said first prop is engaged to said prop engagement portion of said platform and said prop support structure, said platform is supported by said first prop and said primary supporting structure in a position spaced above said default support structure.

2. The platform and platform support system of claim 1, wherein:

(a) said first series of prop support points is more specifically comprised of a plurality of support cavities; and (b) when said first prop is engaged to a respective support cavity an end of said first prop abuts and is supported by surfaces of said respective support cavity.

3. The platform and platform support system of claim 2, further comprising:

(a) a first prop pivot shaft, an axis of which is a first prop pivot axis, engaged to either a prop engagement portion of said platform or said first prop support structure, and said first prop;

(b) wherein said first prop pivot shaft is engaged to said prop engagement portion of said platform or said first prop support structure and said first prop in a manner preventing any substantial relative motion between said platform or said first prop support structure, whichever said first prop pivot shaft is engaged to, and said first prop, other than rotation about said first prop pivot axis; and (c) wherein each prop support point of said first series of prop support points is spaced in directions perpendicular to said first prop pivot axis relative to other prop support points of said first series of prop support points.

4. The platform and platform support system of claim 3, further comprising:

(a) a prop handle comprised of a first handle moment arm and a handle grip member;

(b) wherein said first prop pivot shaft is fixedly engaged to said first prop;

(c) wherein said first handle moment arm is fixedly engaged to said first prop pivot shaft and disposed substantially perpendicular to said first prop pivot shaft and parallel to a portion of said first prop adjacent an intersection of said first prop and said first prop pivot shaft;

(d) wherein said handle grip member is engaged to said first handle moment arm and disposed substantially parallel to, and at a distance from, said first prop pivot axis; and (e) wherein said handle grip member is engaged fixedly to said handle moment arm or, alternatively, in a manner preventing any substantial movement of said handle grip member relative to said first handle moment arm other than rotation about a grip axis of said handle grip member.

5. The platform and platform support system of claim 4, wherein:

(a) said first prop pivot shaft is engaged to said prop engagement portion of said platform as opposed to being engaged to said first prop support structure; and (b) said first series of prop support points is disposed on said first prop support structure as opposed to being disposed on said first platform.

6. The platform and platform support system of claim 5, wherein:

(a) said platform defines one or more prop storage cavities inwardly of a lower surface of said platform;

(b) a first prop storage cavity is of a size and shape and is positioned such that when said first prop is not in use as a support for said platform said first prop can be positioned within said first prop storage cavity such that it is contained substantially inwardly of said lower surface of said platform;

(c) said platform defines a first prop opening at said lower surface of said platform, through which said first prop travels as it is moved into or out of said first prop storage cavity; and (d) wherein said first prop opening is adjacent to and in communication with said first prop storage cavity.

7. The platform and platform support system of claim 6, wherein:

(a) said platform defines one or more pivot shaft slots inwardly of said lower surface of said platform;

(b) said platform defines a first pivot shaft insertion opening in said lower surface of said platform;

(c) said first pivot shaft insertion opening is disposed adjacent to and in communication with a first pivot shaft slot;

(d) when said platform and said platform support system are properly assembled, said first prop pivot shaft is disposed within said first pivot shaft slot;

(e) cross-sections of portions of said first pivot shaft slot within which said first prop pivot shaft is disposed are only slightly larger than corresponding cross-sections of said first prop pivot shaft;

(f) one or more pivot shaft locating tabs protrude from one or more edges of said first pivot shaft insertion opening;

(g) said first pivot shaft insertion opening has a minimum width which is less than a corresponding sectional width of said first prop pivot shaft such that once said first prop pivot shaft is disposed within said first pivot shaft slot it is maintained within said first pivot shaft slot in a manner such that any substantial movement of said first prop pivot shaft relative to said platform, other than rotation about said first prop pivot axis and translation along said first prop pivot axis, is prevented;

(h) said platform is constructed such that said pivot shaft locating tabs and/or said edges of said first pivot shaft insertion opening can deform elastically, and thus increase said minimum width of said first pivot shaft insertion opening, when said first prop pivot shaft is pressed against said one or more edges of said first pivot shaft insertion opening and said pivot shaft locating tabs from outside said first pivot shaft slot, thus allowing said first prop pivot shaft to be inserted through said first pivot shaft insertion opening into said first pivot shaft slot; and (i) said first pivot shaft slot, said first prop storage cavity, said first pivot shaft insertion opening and said first prop opening intersect near an intersection between said first prop pivot shaft and said first prop, such that said first prop can be rotated about said first prop pivot axis and stored within said first prop storage cavity when said first prop is not in use as a support for said platform.

8. The platform and platform support system of claim 7, further comprising:

(a) a prop retaining tab engaged to said platform;
(b) wherein said prop retaining tab protrudes into a path through which said first prop travels, as said first prop rotates about said first prop pivot axis, such that when said first prop moves toward said prop retaining tab said first prop eventually contacts said prop retaining tab and said first prop is thus retained on a side of said prop retaining tab on which said first prop is disposed;
(c) wherein said prop retaining tab and/or said first prop are of a construction such that one or both will flex if subjected to forces of sufficient magnitude, such that if said first prop is forcefully urged against said prop retaining tab said first prop and/or said prop retaining tab deform elastically and allow said first prop to pass said prop retaining tab; and
(d) wherein said prop retaining tab is located near said lower surface of said platform and near an intersection of said first prop and said first prop pivot shaft.

9. The platform and platform support system of claim 8, wherein:
(a) said platform defines a handle storage cavity;
(b) said handle storage cavity extends inwardly from said lower surface of said platform;
(c) when said first prop is disposed within said first prop storage cavity, said prop handle is disposed within said handle storage cavity; and
(d) said handle storage cavity is of such a shape and size that a hand clearance void surrounds said handle grip member when said prop handle is disposed within said handle storage cavity.

10. The platform and platform support system of claim 9, further comprising:
(a) a second prop fixedly engaged to a second prop pivot shaft;
(b) wherein an axis of said second prop pivot shaft defines a second prop pivot axis;
(c) wherein said second prop pivot shaft is engaged to said prop engagement portion of said platform and said second prop in a manner preventing any substantial relative motion between said platform and said second prop, other than rotation about said second prop pivot axis;
(d) wherein said second prop pivot shaft is disposed such that said second prop pivot axis is coincident with said first prop pivot axis;
(e) a second handle moment arm fixedly engaged to said second prop pivot shaft;
(f) wherein said second handle moment arm is engaged to said handle grip member fixedly or, alternatively, in a manner preventing any movement of said handle grip member relative to said second handle moment arm other than rotation about said grip axis of said handle grip member;
(g) wherein said second handle moment arm is disposed substantially parallel to said first handle moment arm; and
(h) a second series of prop support points to one of which said second prop could be engaged such that said second prop would provide further support for said prop engagement portion of said platform.

11. The platform and platform support system of claim 10, further comprising:
(a) bedding components engaged to said platform.

12. The platform and platform support system of claim 4, further comprising:
(a) bedding components engaged to said platform.

13. A platform and platform support system, comprising;
(a) a platform;
(b) a first prop which is pivotally engaged to said platform;
(c) wherein said first prop is constructed and engaged to said platform such that said first prop can be used to support a prop engagement portion of said platform;
(d) wherein said platform defines a first prop storage cavity inwardly of an outer surface of said platform;
(e) wherein said first prop storage cavity is of a size and shape and is positioned such that when said first prop is not in use as a support for said platform said first prop can be positioned within said first prop storage cavity such that it is contained substantially inwardly of said outer surface of said platform;
(f) wherein said platform defines a first prop opening in said outer surface of said platform, through which said first prop travels as it is moved into or out of said first prop storage cavity; and
(g) wherein said first prop opening is adjacent to and in communication with said first prop storage cavity.
(h) a first prop pivot shaft, an axis of which is a first prop pivot axis, engaged to said prop engagement portion of said platform and said first prop;
(i) wherein said first prop pivot shaft is engaged to said prop engagement portion of said platform and said first prop in a manner preventing any substantial relative motion between said platform and said first prop other than rotation about said first prop pivot axis;
(j) a prop handle comprised of a handle grip member and a first handle moment arm;
(k) wherein said first handle moment arm is fixedly engaged to said first prop pivot shaft and disposed substantially perpendicular to said first prop pivot shaft and substantially parallel to a portion of said first prop near a point of engagement between said first prop and said first prop pivot shaft;
(l) wherein said handle grip member is engaged to said first handle moment arm and said handle grip member is disposed substantially parallel to and at a distance from said first prop pivot axis;
(m) wherein said handle grip member is engaged fixedly to said first handle moment arm or, alternatively, in a manner preventing any movement of said handle grip member relative to said first handle moment arm other than rotation about a grip axis of said handle grip member;
(n) wherein said first prop pivot shaft is fixedly engaged to said first prop;
(o) wherein said platform defines a handle storage cavity inwardly of said outer surface of said platform;
(p) wherein when said first prop is disposed within said first prop storage cavity, said prop handle is disposed within said handle storage cavity; and
(q) wherein said handle storage cavity is of such a shape and size that a hand clearance void surrounds said handle grip member when said prop handle is disposed within said handle storage cavity.

14. The platform and platform support system of claim 13, wherein:
(a) said platform defines one or more pivot shaft slots inwardly of said outer surface of said platform;
(b) said platform defines a first pivot shaft insertion opening in said outer surface of said platform;

(c) wherein said first pivot shaft insertion opening is disposed adjacent to and in communication with a first pivot shaft slot;

(d) wherein when said platform and said platform support system are properly assembled, said first prop pivot shaft is disposed within said first pivot shaft slot;

(e) wherein cross sections of portions of said first pivot shaft slot within which said first prop pivot shaft is disposed are only slightly larger than corresponding cross-sections of said first prop pivot shaft;

(f) wherein one or more pivot shaft locating tabs protrude from one or more edges of said first pivot shaft insertion opening;

(g) wherein said first pivot shaft insertion opening has a minimum width which is less than a corresponding sectional width of said first prop pivot shaft, such that once said first prop pivot shaft is disposed within said first pivot shaft slot, it is maintained within said first pivot shaft slot in a manner such that any substantial movement of said first prop pivot shaft relative to said platform, other than rotation about said first prop pivot axis and translation along said first prop pivot axis, is prevented;

(h) wherein said platform is constructed such that said pivot shaft locating tabs and/or said edges of said first pivot shaft insertion opening can deform elastically, and thus increase said minimum width of said first pivot shaft insertion opening, when said first prop pivot shaft is pressed against said one or more edges of said first pivot shaft insertion opening and said pivot shaft locating tabs from outside said first pivot shaft slot, thus allowing said first prop pivot shaft to be inserted through said first pivot shaft insertion opening into said first pivot shaft slot; and (i) wherein said first pivot shaft slot, said first prop storage cavity, said first pivot shaft insertion opening and said first prop opening intersect near an intersection between said first prop pivot shaft and said first prop, such that said first prop can be rotated about said first prop pivot axis and stored within said first prop storage cavity when said first prop is not in use as a support for said platform.

15. The platform and platform support system of claim 14, further comprising:

(a) a prop retaining tab engaged to said platform;

(b) wherein said prop retaining tab protrudes into a path through which said first prop travels as said first prop rotates about said first prop pivot axis such that when said first prop moves toward said prop retaining tab said first prop eventually contacts said prop retaining tab and said first prop is thus retained on a side of said prop retaining tab on which said first prop is disposed;

(c) wherein said prop retaining tab and/or said first prop are of a construction such that one or both will flex if subjected to forces of sufficient magnitude, such that if said first prop is forcefully urged against said prop retaining tab said first prop and/or said prop retaining tab deform elastically and allow said first prop to pass said prop retaining tab; and (d) wherein said prop retaining tab is located near said outer surface of said platform and near an intersection of said first prop and said first prop pivot shaft.

16. The platform and platform support system of claim 15, further comprising:

(a) a second prop fixedly engaged to a second prop pivot shaft;

(b) wherein an axis of said second prop pivot shaft defines a second prop pivot axis;

(c) wherein said second prop pivot shaft is engaged to said prop engagement portion of said platform and said second prop in a manner preventing any substantial relative motion between said platform and said second prop, other than rotation about said second prop pivot axis;

(d) wherein said second prop pivot shaft is disposed such that said second prop pivot axis is coincident with said first prop pivot axis;

(e) a second handle moment arm fixedly engaged to said second prop pivot shaft;

(f) wherein said second handle moment arm is engaged to said handle grip member fixedly or, alternatively, in a manner preventing any movement of said handle grip member relative to said second handle moment arm other than rotation about said grip axis of said handle grip member; and (g) wherein said second handle moment arm is disposed substantially parallel to said first handle moment arm.

* * * * *